Sept. 7, 1965
V. C. MOORE
3,204,487
AUTOMATIC TRANSMISSION
Filed April 4, 1963
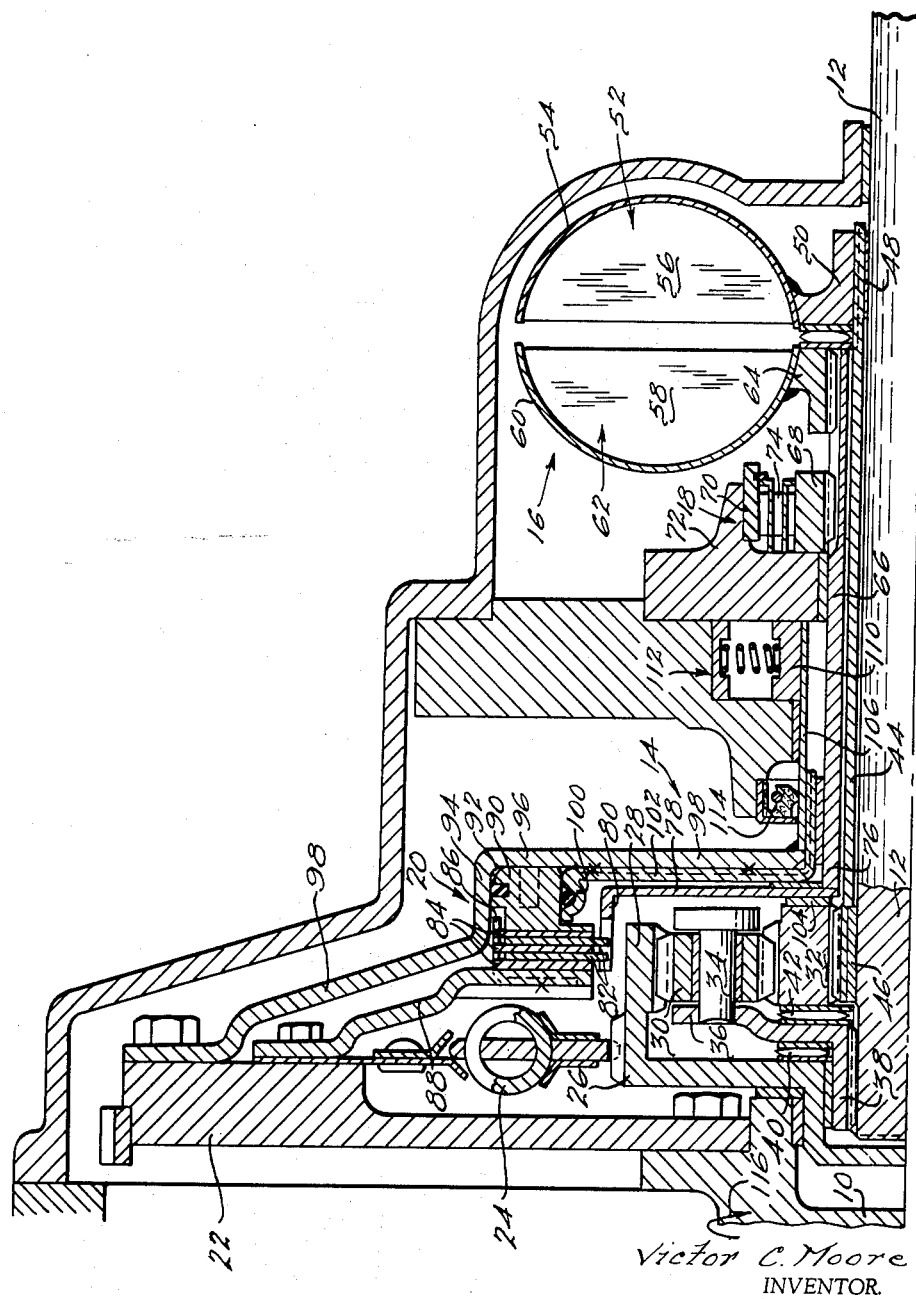

United States Patent Office 3,204,487
Patented Sept. 7, 1965

3,204,487
AUTOMATIC TRANSMISSION
Victor C. Moore, Farmington, Mich., assignor to Ford Motor Company, Dearborn, Mich., a corporation of Delaware
Filed Apr. 4, 1963, Ser. No. 270,673
6 Claims. (Cl. 74—688)

This invention relates to a transmission, and more particularly, to a torque transmitting mechanism preferably for use in a motor vehicle driveline.

Most automatic transmissions in use today have either a hydraulic torque converter or fluid coupling unit as the initial stage of the transmission to permit start-up of the motor vehicle and smooth speed ratio changes without the use of a conventional manually operated clutch. In order to satisfy torque and other requirements, the unit generally is of a large diameter, such that a hump of considerable height is present in the passenger section of the motor vehicle, which reduces the usable space.

This invention relates to a torque transmitting mechanism that not only provides initial start-up of an automatic transmission and initial torque multiplication without the use of a conventional manual clutch, but is of a small overall size, thereby minimizing the hump or floor tunnel in the passenger section of a motor vehicle. Its compact size also renders it adaptable for use in many locations, such as, for example, across the motor vehicle rear axle where a conventional torque converter plus gearing type of automatic transmission installation would not be practical. The torque transmitting mechanism of the invention is also economical to manufacture and provides good fuel economy without a sacrifice in performance. It also eliminates the need for a transmission cooler and its fluid connections, generally required in transmissions of the type described.

The invention provides the above advantages through the use of a single planetary gearset providing two ranges of operation as controlled by a small diameter hydrodynamic drive device and a selectively engageable clutch. During one driving range, the rotating hydrodynamic drive device, in conjunction with an overrunning brake, acts as a reaction member for the gearset. During the second driving range, the device acts as a hydraulic coupling to establish a split torque power path to the gearset. Thus, initial torque multiplication and a smooth start-up of the motor vehicle is provided without the use of a manually operated clutch, while a subsequent lock-up of the gearset provides a direct transfer of the engine torque to the output shaft of the mechanism.

One of the objects of the invention, therefore, is to provide a torque transmitting mechanism that is simple in construction, economical to manufacture, provides good fuel economy and operating efficiencies, and provides several ranges of operation with smooth changes between.

It is another object of the invention to provide a multi-speed torque transmitting mechanism having a small overall configuration, thereby providing a compact package adaptable for installation in many locations on a motor vehicle.

It is a further object of the invention to provide a torque transmitting mechanism that substantially reduces the height of the floor tunnel or hump normally present in the passenger compartment of a motor vehicle, and yet provides initial torque multiplication and smooth start-up of the motor vehicle without the use of a neutral clutch between the engine and transmission.

Other objects, features, and advantages will become apparent upon reference to the succeeding, detailed description of the invention, and to the drawing illustrating the preferred embodiment thereof; wherein the figure schematically illustrates a cross-sectional view of one-half of a torque transmitting mechanism embodying the invention.

The figure shows, in general, a power input shaft 10 connected to a power output shaft 12 by means of a planetary gearset 14. The gearset is controlled by a relatively small diameter fluid coupling 16 which, during one stage of operation, is connected to an overrunning brake 18 to provide a reduction drive through the gearset. During another stage, the coupling is connected by a selectively engageable clutch 20 to the input shaft 10 to provide a split torque power path to the gearset, thereby establishing a combined hydraulic and mechanical direct drive between the power input and output shafts.

More specifically, input shaft 10 is driven by any suitable source of power, such as, for example, the internal combustion engine for a motor vehicle, and has a flywheel 22 bolted to it. The flywheel in turn is drivingly connected by a torsional vibration damper 24 of a known type to the drumlike portion 26 of an internal or ring gear 28 constituting one element of the gearset 14. The gearset is of the simple three element planetary type and includes a number (only one shown) of circumferentially spaced planet pinions 30 meshing with the ring gear and a sun gear 32. The pinions are rotatably supported upon shaft 34 secured in an annular carrier member 36. The carrier has a hub 38 internally splined to one end of the power output shaft 12, and axially and rotatably located between the sun and ring gear hub portions by thrust bearings 40 and 42.

Sun gear 32 normally acts as a reaction member when the gearset is conditioned to establish forward reduction drive between the input and output shafts to provide initial torque multiplication. The gear is internally splined to one end of a sleeve shaft 44 rotatably mounted on the power output shaft 12 on journal bearings 46 and 48. The opposite end of the shaft is splined to the hub 50 of an impeller or pump member 52 constituting one element of the fluid coupling 16. The pump includes an outer annular semi-toroidal shroud 54 fixed to the hub 50 and supporting and enclosing a number of circumferentially spaced blades 56, which are substantially dish-shaped in cross section. The pump blades face a number of similarly shaped but oppositely disposed turbine blades 58 secured within an outer semi-toroidal shroud 60 of a turbine member 62. The coupling is maintained filled with fluid during all forward and reverse operating phases of the mechanism, the shrouds together defining a toroidal path for the flow of fluid in a counterclockwise direction between the pump and turbine during one phase of operation, and in a clockwise direction during another phase of operation for the drive of the pump by the turbine in a manner to be described more clearly later.

Turbine 62 has a hub 64 splined to a sleeve shaft 66. Also splined to this shaft is the inner annular race 68 of an overrunning mechanical coupling or one-way brake 18. The brake has an outer annular race 70 fixed within a stationary member 72 secured in the transmission casing, and is separated from the inner race 68 by a number of circumferentially spaced and angularly disposed sprags 74. The brake is engaged in a known manner by a wedging movement of the sprags between the inner and outer races upon counterclockwise rotation of the inner race and turbine 62, relative to the outer race, and releases upon clockwise relative movement of the turbine and inner race to permit their free rotation in this direction.

The sleeve shaft 66 is adapted to be connected to the power input shaft 10 by the clutch 20 to provide a split torque drive to the gearset. For this purpose, the forward end 76 of the shaft has a radial flange 78 with an axial extension 80 to which are splined a number of annular friction clutch discs 82. Interleaved with these discs are a number of similar annular friction driving discs 84 externally splined to an annular support 86. The support is welded or otherwise secured to an annular flange member 88 bolted to the engine flywheel 22.

Clutch 20 is shown as being of the fluid pressure actuated type, and is engaged by axial movement of a piston 90. The piston is sealingly engaged with the walls of a fluid chamber 92 defined by axial and radial portions 94 and 96 of a second annular flange 98 bolted to the flywheel 22, and the beaded axial extension 100 of a further flange 102 fixed to flange 98. The clutch is disengaged by suitable spring means, not shown.

The inner ends of flanges 98 and 102 are axially and rotatably located between the flange 78 and the sleeve shaft 66 by bearing members, as shown, and are welded or otherwise secured to a sleeve shaft 106. The shaft is spaced from and rotatably supports sleeve shaft 66, and is splined at its rearward portion to the rotor 110 of a fluid pressure suply pump 112. The pump is shown as being of the slipper type although other suitable types may be used. It supplies fluid under a varying pressure to a control system, not shown, from which the fluid is fed to the coupling 16 to fill it, and to clutch piston chamber 92 to engage the clutch 20 when desired. The control system, for example, could be sensitive to vehicle speed and throttle valve openings to change the mechanism from a reduction drive to a direct drive, or vice versa, automatically when conditions indicate such a change would be desired. A suitable lip seal 114 prevents leak of fluid from the pump into the transmission housing cavity.

In operation, initially, coupling 16 is filled with fluid, and clutch 20 is disengaged. Clockwise or forward rotation of power input shaft 10 in the direction of arrow 116 drives ring gear 28 in the same direction. By virtue of its connection to the output shaft 12, the initial resistance to rotation of carrier 36 causes planet pinions 30 to be rotated clockwise about the stationary carrier to rotate sun gear 32 and pump 52 in a counterclockwise or reverse direction. The rotation of turbine 62 in this direction by the pump, however, is prevented by the engagement of one-way brake 18. The coupling at this time therefore acts as a fluid brake, with the stationary turbine resisting reverse rotation of the pump due to the splashing of fluid discharged in a counterclockwise direction from the pump blades against the stationary turbine blades. Accordingly, the sun gear rotates slowly in a reverse or counterclockwise direction, the coupling and brake providing the torque reaction necessary to cause pinions 30 to walk around the sun gear to drive carrier 36 and output shaft 12 in a forward or clockwise direction, and at a speed reduced from that of input shaft 10, as determined by the ratio of the gearset. While the speed of output shaft 12 is slightly reduced from the speed at which it would rotate if sun gear 32 were held completely stationary, there is no reduction in torque output to the shaft. Thus, the construction provides a very smooth initial start-up of a transmission or motor vehicle by the controlled slip through the coupling 16.

When an upshift to direct drive is desired, fluid under pressure is introduced into the apply chamber 92 of clutch 20 to move piston 90 to engage clutch discs 82 and 84. Thus, the power input shaft 10 is directly connected to sleeve shaft 66 to now rotate turbine 62 in a forward or clockwise direction, which is permitted by the release of one-way brake 18. The clockwise rotation of the turbine therefore causes a change in the direction of circulation of the fluid in coupling 16 to reverse the direction of rotation of pump 52 and drive sleeve shaft 44 and sun gear 32 in a clockwise or forward direction. Thus, a split torque combined hydraulic and mechanical drive of the gearset is effected by the simultaneous rotation of the ring and sun gears from the input shaft, and substantially at the same speeds. The gearset thus locks up and the torque of the input shaft is transmitted directly to the output shaft, the hydraulic losses through the coupling being negligible.

It can be seen therefore, that the changeover of the pump 52 from rotating in a reverse or counterclockwise direction to a clockwise or forward direction provides a very smooth transition between the reduction drive and the direct drive ranges of operation of the gearset, the coupling changing from a reaction member to a fluid clutch.

It will also be seen that the fluid coupling establishes engine braking in the direct drive range to provide coast or hill braking, due to the forward or clockwise overspeed of sun gear 32 and pump 50 by output shaft 12 and carrier 38 being retarded by the resistance of the turbine to a faster rotation by the pump than it is being driven by the engine input shaft 10.

From the foregoing, therefore, it will be seen that the invention provides a two-speed transmission through the use of a single simple planetary gearset controlled by a fluid coupling, which during one direction of rotation acts as a hydraulic brake to provide a reaction for the gearset, and during another drive range smoothly reverses its direction of rotation to condition the gearset for a direct drive therethrough. It will also be seen that the portion of the mechanism behind the engine flywheel has a substantially constant small diameter, thus reducing protrusion into the passenger section of the motor vehicle.

While the invention has been illustrated in its preferred embodiment, it will be clear to those skilled in the arts to which the invention pertains that it would have use in many installations other than that illustrated, and that many changes and modifications may be made thereto without departing from the scope of the invention.

I claim:

1. A transmission having power input and output shafts, and means connecting said shafts providing a plurality of drives therebetween, said means including a planetary gearset having drive and driven and other rotatable members, means connecting said drive member to said input shaft and said driven member to said output shaft, means for resisting rotation of another of said members in a direction opposite to that of said input shaft to condition said gearset for a torque multiplying forward reduction drive therethrough, said latter means including a hydrodynamic torque transmitting device filled with fluid at all times, and selectively operable means to connect said input shaft and said torque transmitting device to provide a split torque drive to said gearset.

2. A transmission having a forwardly rotating power input shaft and an output shaft, and means connecting said shafts providing a plurality of drives therebetween, said means including a planetary gearset having drive and driven and other rotatable members, means connecting said drive member to said input shaft and said driven member to said output shaft, means including an automatically releasable one-way brake for resisting rotation of another of said members in a direction opposite to that of said input shaft to condition said gearset for a torque multiplying forward reduction drive therethrough, said latter means including a constantly filled fluid coupling between said another member and said brake, and selectively engageable means connecting said input shaft and said coupling to rotate said another member in the direction of rotation of said input shaft thereby releasing said brake and providing a split torque drive to said gearset.

3. A transmission having a forwardly rotating power input shaft and an output shaft, and means connecting said shafts providing a plurality of drives therebetween, said means including a planetary gearset having sun and ring gears and a planet carrier, means connecting said ring gear to said input shaft and said carrier to said output shaft, means including an automatically releasable one-way brake for resisting rotation of said sun gear in a reverse direction to condition said gearset for a forward torque multiplying reduction drive therethrough, said latter means including a constantly filled fluid coupling between said sun gear and said brake, and selectively engageable means connecting said input shaft to said coupling to rotate said sun gear in a forward direction thereby releasing said brake and providing a split torque direct drive through said gearset.

4. A transmission having a forwardly rotating power input shaft and an output shaft, and means connecting said shafts providing a plurality of drives therebetween, said means including a planetary gearset having drive and driven and other rotatable members, means connecting said drive member to said input shaft and said driven member to said output shaft, means including an automatically releasable one-way brake for resisting reverse rotation of another of said members to condition said gearset for a forward reduction drive therethrough, said latter means including a constantly filled fluid coupling having a pump connected to said another member and a turbine connected to said brake, and selectively engageable means connecting said input shaft and said turbine to rotate said pump and said another member in a forward direction thereby releasing said brake and providing a different split torque drive to said gearset whereby a combined hydraulic mechanical direct drive through said gearset is established.

5. A transmission having a forwardly rotating power input shaft and an output shaft, and means connecting said shafts providing a substantially direct drive and a torque multiplying forward reduction drive therebetween, said means including a planetary gearset having sun and ring gears intermeshed with planet pinions supported by a carrier, means connecting said ring gear to said input shaft and said carrier to said output shaft, means including automatically releasable one-way brake means for resisting reverse rotation of said sun gear to condition said gearset for a forward reduction drive therethrough, said latter means including a fluid coupling having a pump connected to said sun gear and a turbine connected to said brake means, said coupling being filled with fluid at all times and constituting a fluid brake upon reverse rotation of said pump by said sun gear and the holding of said turbine stationary by said one-way brake and constituting a fluid clutch upon forward rotation of said turbine to rotate said pump and sun gear forwardly, and selectively operable means to rotate said turbine forwardly.

6. A transmission having a forwardly rotating power input shaft and an output shaft, and means connecting said shafts providing a plurality of drives therebetween, said means including a planetary gearset having sun and ring gears intermeshed with planet pinions supported by a carrier, means connecting said ring gear to said input shaft and said carrier to said output shaft, means including releasable one-way brake means for resisting reverse rotation of said sun gear to condition said gearset for a forward reduction drive therethrough, said latter means including a fluid coupling having a pump connected to said sun gear and a turbine connected to said brake means, said coupling being filled with fluid at all times and constituting a fluid brake upon reverse rotation of said pump by said sun gear and the holding of said turbine stationary by said one-way brake, and selectively engageable clutch means between said input shaft and turbine when engaged effecting a release of said brake and a forward drive of said pump by said turbine to rotate said sun gear in the same direction to provide a split torque drive of said gearset.

References Cited by the Examiner

UNITED STATES PATENTS

| | | | |
|---|---|---|---|
| 2,309,912 | 2/43 | Lazaga | 74—757 X |
| 2,343,509 | 3/44 | Jandasek | 74—782 |
| 2,355,876 | 8/44 | Lazaga | 74—688 |
| 2,517,897 | 8/50 | Lazaga | 74—688 |
| 3,091,980 | 6/63 | Black | 74—782 X |

DON A. WAITE, *Primary Examiner.*

UNITED STATES PATENT OFFICE
CERTIFICATE OF CORRECTION

Patent No. 3,204,487

September 7,

Victor C. Moore

It is hereby certified that error appears in the above numbered patent requiring correction and that the said Letters Patent should read as corrected below.

Column 2, line 27, for "shaft" read -- shafts --; column line 23, for "suply" read -- supply --; column 6, line 19, a "forward" insert -- torque multiplying --.

Signed and sealed this 29th day March 1966.

(SEAL)
Attest:

ERNEST W. SWIDER
Attesting Officer

EDWARD J. BRENNE
Commissioner of Patents